US011124086B2

(12) United States Patent
Botts et al.

(10) Patent No.: US 11,124,086 B2
(45) Date of Patent: Sep. 21, 2021

(54) DYNAMIC CONTROL OF CONFIGURATIONS OF ELECTRICAL CIRCUITS

(71) Applicant: Premergy, Inc., Macon, GA (US)

(72) Inventors: Richard Edward Botts, Macon, GA (US); Lanier M. Davenport, Macon, GA (US); Andrew L. Thomas, Macon, GA (US)

(73) Assignee: Premergy, Inc., Macon, GA (US)

( * ) Notice: Subject to any disclaimer, the term of this patent is extended or adjusted under 35 U.S.C. 154(b) by 116 days.

(21) Appl. No.: 16/483,530

(22) PCT Filed: Feb. 7, 2018

(86) PCT No.: PCT/US2018/017176
§ 371 (c)(1),
(2) Date: Aug. 5, 2019

(87) PCT Pub. No.: WO2018/148249
PCT Pub. Date: Aug. 16, 2018

(65) Prior Publication Data
US 2020/0127470 A1 Apr. 23, 2020

Related U.S. Application Data

(60) Provisional application No. 62/456,316, filed on Feb. 8, 2017.

(51) Int. Cl.
H02J 7/00 (2006.01)
H02J 7/35 (2006.01)
(Continued)

(52) U.S. Cl.
CPC ............ B60L 58/12 (2019.02); B60L 7/12 (2013.01); B60L 7/18 (2013.01); B60L 58/19 (2019.02);
(Continued)

(58) Field of Classification Search
None
See application file for complete search history.

(56) References Cited

U.S. PATENT DOCUMENTS 10,800,286 B2    10/2020  Doersam et al.
2001/0012794 A1*  8/2001  Nishihara ......... H01M 10/4207
                                            455/574

(Continued)

FOREIGN PATENT DOCUMENTS

DE  102015006208 A1   12/2015
JP     2018026973 A    2/2018

OTHER PUBLICATIONS

Extended European Search Report for EP Application No. 18751022.7 dated Nov. 9, 2020 (7 pages).

(Continued)

Primary Examiner — Jared Fureman
Assistant Examiner — Aqeel H Bukhari
(74) Attorney, Agent, or Firm — Eversheds Sutherland (US) LLP

(57) ABSTRACT

Systems and methods for dynamic control of a configuration of electrical circuits are provided. An example system includes a plurality of electric power sources and a plurality of switches configured to connect and disconnect some of the electric power sources. The system may include a controller coupled to the switches. The controller may be configured to enable and disable the switches to cause a change in a configuration of the connections between the electric power sources. The electric power sources can include at least one generator and at least two batteries. The controller can be further configured to cause a change in the configuration to connect the two batteries in series to a load for discharging and connect the two batteries in parallel to the generator for recharging.

19 Claims, 13 Drawing Sheets

(51) Int. Cl.
  *H01M 10/42* (2006.01)
  *B60L 58/12* (2019.01)
  *H02P 3/14* (2006.01)
  *H02J 7/14* (2006.01)
  *B60L 7/12* (2006.01)
  *B60T 8/17* (2006.01)
  *H01M 10/44* (2006.01)
  *H01M 10/48* (2006.01)
  *B60L 7/18* (2006.01)
  *B60L 58/19* (2019.01)
  *H02P 101/45* (2016.01)
  *B60L 53/51* (2019.01)

(52) U.S. Cl.
  CPC ............. *B60T 8/17* (2013.01); *H01M 10/425* (2013.01); *H01M 10/441* (2013.01); *H01M 10/482* (2013.01); *H02J 7/0021* (2013.01); *H02J 7/0024* (2013.01); *H02J 7/0047* (2013.01); *H02J 7/1423* (2013.01); *H02J 7/35* (2013.01); *H02P 3/14* (2013.01); *B60L 53/51* (2019.02); *B60L 2240/545* (2013.01); *B60L 2240/547* (2013.01); *B60T 2201/04* (2013.01); *B60T 2250/00* (2013.01); *B60T 2250/04* (2013.01); *B60T 2270/60* (2013.01); *H01M 2010/4271* (2013.01); *H01M 2220/20* (2013.01); *H02P 2101/45* (2015.01); *Y02T 10/70* (2013.01)

(56) References Cited

U.S. PATENT DOCUMENTS

| | | |
|---|---|---|
| 2006/0092583 A1 | 5/2006 | Alahmad et al. |
| 2008/0143292 A1 | 6/2008 | Ward |
| 2010/0231162 A1 | 9/2010 | Gibson et al. |
| 2011/0316471 A1 | 12/2011 | Yang et al. |
| 2013/0026992 A1* | 1/2013 | Ruan ................ H01M 10/4207 320/118 |
| 2013/0062952 A1 | 3/2013 | Park et al. |
| 2015/0222132 A1 | 8/2015 | Shikatani et al. |
| 2017/0033564 A1* | 2/2017 | Lin ........................ H02S 40/38 |

OTHER PUBLICATIONS

PCT International Search Report and Written Opinion for PCT Application No. PCT/US2018/017176 dated Apr. 26, 2018 (12 pages).

* cited by examiner

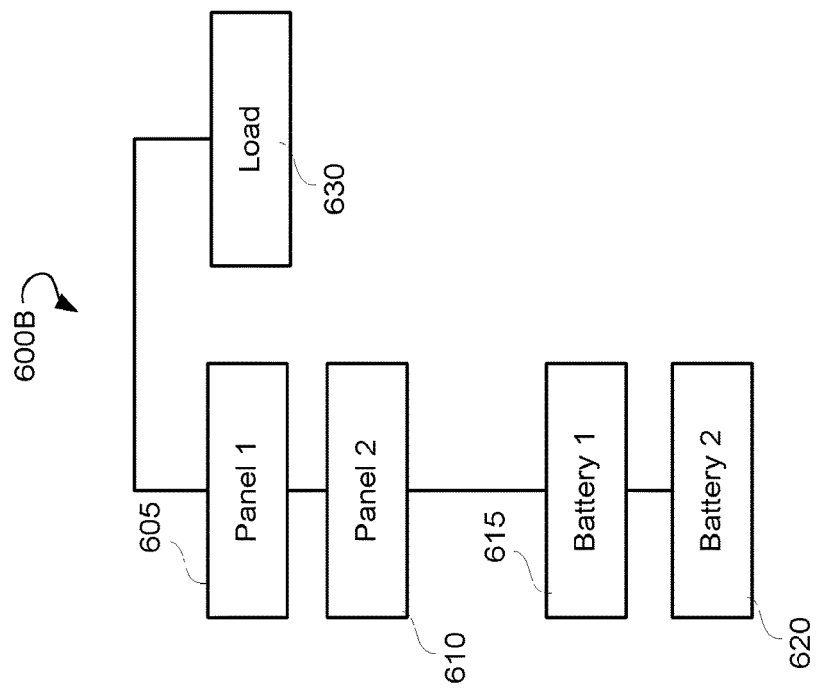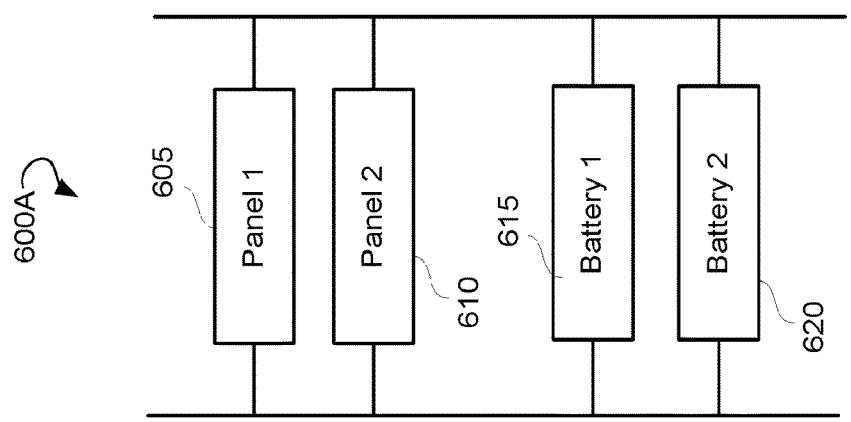
FIG. 6

```
┌─────────────────────────────────────────────────────────────────┐
│ Determine that a load of an electrical device coupled a first   │
│ battery bank and a second battery bank exceeds a first threshold│
│                            1302                                  │
└─────────────────────────────────────────────────────────────────┘
                               │
                               ▼
┌─────────────────────────────────────────────────────────────────┐
│ Provide a signal to one or more switches to change a connection │
│ configuration between the first battery bank and the second     │
│ battery bank to cause the first and second battery banks to     │
│ provide power to the electrical device simultaneously           │
│                            1304                                  │
└─────────────────────────────────────────────────────────────────┘
                               │
                               ▼
┌─────────────────────────────────────────────────────────────────┐
│ Determine that the load of the electrical device fails to meet  │
│ the first threshold                                              │
│                            1306                                  │
└─────────────────────────────────────────────────────────────────┘
                               │
                               ▼
┌─────────────────────────────────────────────────────────────────┐
│ Provide a signal to the one or more switches to change the      │
│ connection configuration between the first battery bank and the │
│ second battery bank such that the first battery bank provides   │
│ power to the electrical device while the second battery bank is │
│ being charged                                                    │
│                            1308                                  │
└─────────────────────────────────────────────────────────────────┘
```

FIG. 13

DYNAMIC CONTROL OF CONFIGURATIONS OF ELECTRICAL CIRCUITS

CROSS REFERENCE TO RELATED APPLICATIONS

This application claims the priority benefit of PCT/US2018/017176 filed on Feb. 7, 2018 which claims priority benefit of U.S. Provisional Application No. 62/456,316, filed Feb. 8, 2017. The entire contents of which are incorporated by reference herein.

TECHNICAL FIELD

The disclosure relates to electrical circuits, and, more particularly, to dynamic control of configurations of electrical circuits.

BACKGROUND

Electric power systems including battery banks and generators are widely used to provide power to various devices and appliances. However, charging and discharging electrical power systems can be difficult. On one side, to ensure efficient operations, it is desirable for an electric power system to output power at its maximum capacity. To maximize power output, battery banks can be connected in series. On other side, it is also important to ensure that the battery banks can be recharged as fast as possible, which is difficult to accomplish when the battery banks are connected in series.

SUMMARY OF THE DISCLOSURE

This disclosure relates to systems and methods for dynamic control of configurations of electrical circuits. Certain embodiments can facilitate and/or control configurations of electric power sources and/or circuits.

According to one embodiment of the disclosure, a system for dynamic control of a configuration of electrical circuits is provided. The system may include a plurality of electric power sources and a plurality of switches. The switches can be configured to connect and disconnect at least some of the electric power sources. The system may further include a controller communicatively coupled to the switches. The controller can be configured to enable and disable the switches to cause a change in a configuration of connections between the electric power sources.

In some embodiments, the switches include at least one transistor. In certain embodiments, the transistor includes a metal-oxide-semiconductor field-effect transistor (MOSFET). In some embodiments, the switches include at least one electromechanical switch.

In some embodiments, the change in the configuration includes a change of a connection of at least two of the electric power sources from in series to parallel or a change of the connection of the at least two of the electric power sources from parallel to in series.

In some embodiments, the electric power sources can be connected in an array. The controller can be configured to determine whether a voltage of at least one of the electric power sources is less than a predetermined value. Based on the determination, the controller can selectively enable switches to disconnect the electric power source from the array. In certain embodiments, the electric power sources can include at least one solar panel.

In some embodiments, the electric power sources include at least one generator and at least two batteries. The controller can be configured to connect the two batteries to a load in series for discharging. The controller can be also configured to connect the two batteries to the generator in parallel for recharging. In certain embodiments, two batteries can be recharged at the lowest voltage capacity of the two batteries.

Other embodiments, systems, methods, features, and aspects will become apparent from the following description taken in conjunction with the following drawings.

BRIEF DESCRIPTION OF THE DRAWINGS

Reference will now be made to the accompanying drawings, which are not necessarily drawn to scale, and wherein:

FIG. 6 illustrates example configurations of a solar panel system, according to embodiments of the disclosure.

FIGS. 11-13 illustrate flowcharts illustrating example methods for dynamic control of configurations of electrical circuits, according to various embodiments of the disclosure.

DETAILED DESCRIPTION

Figure 1:
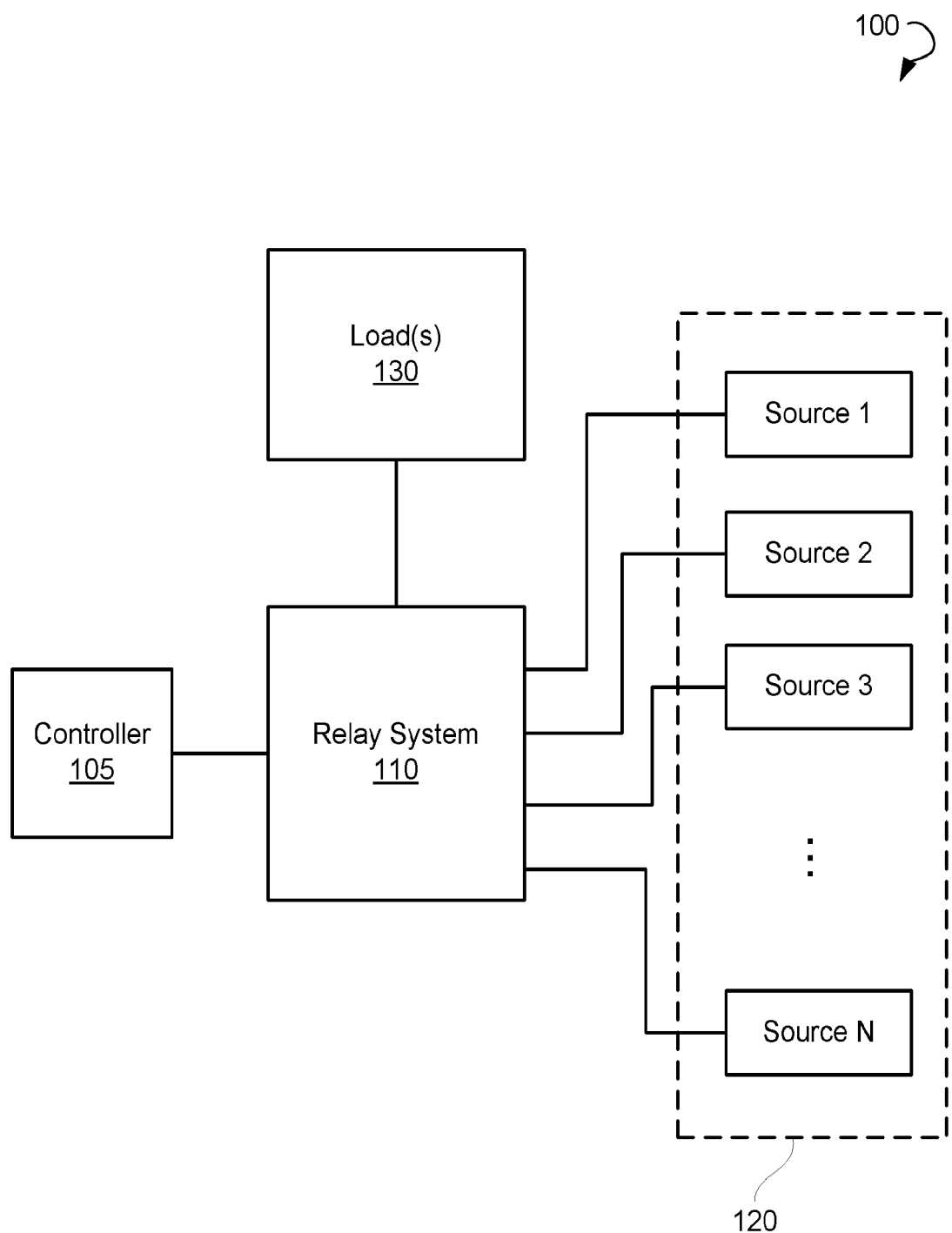
FIG. 1 illustrates a block diagram of an environment in which methods and systems for dynamic control of configurations of electrical circuits can be practiced, according to various embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure are directed to methods and systems for dynamic control of configurations of electrical circuits. Certain embodiments may facilitate control of discharging and recharging batteries in vehicles, mobile phones, solar plants, and so forth via manipulation and/or control of connections between individual batteries and/or cells. For example, certain embodiments may cause batteries or cells to be connected in series connections or parallel connections based at least in part on a charging or discharging status, or load, on the system. Some embodiments of the disclosure may provide methods for controlling solar panel systems.

An example method for dynamic control of configurations of electrical circuits can include providing a plurality of electric power sources. The method can further include providing a plurality of switches configured to connect and disconnect some of the electric power sources, or to cause series or parallel connections between various batteries or cells. The method can further include providing a controller coupled to the switches, the controller being configured to enable and disable the switches to cause a change in a configuration of connections between the electric power sources.

Illustrative Device Architecture

As used herein, the terms "data," "content," "information," and similar terms may be used interchangeably to refer to data capable of being transmitted, received, and/or stored in accordance with embodiments of the present disclosure. Thus, the use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, a flexible disk, a hard disk, solid-state storage (SSS) (e.g., a solid state drive (SSD)), a solid state card (SSC), a solid state module (SSM), an enterprise flash drive, magnetic tape, or any other non-transitory magnetic medium, and/or the like. A non-volatile computer-readable storage medium may also include a punch card, paper tape, an optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, a system, a computing device, a computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

The following provides a detailed description of various example embodiments related to methods and systems for dynamic control of configurations of electric power sources circuits.

Example Relay System for Dynamic Control

An environment 100, in which methods and systems for dynamic control of configurations of electrical circuits can be practiced in accordance with example embodiments of the disclosure, is illustrated generally in FIG. 1. The environment 100 can include one or more controllers 105, a relay system 110, one or more electric power sources 120, and one or more loads 130.

According to various embodiments of the disclosure, the relay system 110 may include one or more switches and/or relays. In some embodiments, the switches and relays may be configured to connect or disconnect (isolate) the electric power sources 120 from each other. For example, the switches or relays may be able to connect certain batteries to each other in a parallel connection or a series connection, and may connect or disconnect certain rechargeable batteries from each other or the system. In certain embodiments, the switches and relays can be configured to connect and disconnect groups of the electric power sources 120 from each other. In some embodiments, the switches and relays may be configured to change a type of connection between either individual electric power sources 120 or groups of the electric power sources 120 from in series to parallel and from parallel to in series. The switches and relays can be further configured to connect and disconnect the electric power sources 120 (either individually or in groups) from the load(s) 130. In various embodiments, the relay system 110 can include electromechanical relays, electromechanical switches, and/or transistors configured to switch electronic signals.

In various embodiments, the configuration of the connections between the electric power sources 120 and the connections between the electric power sources 120 and the load(s) 130 can be performed by the controller 105 based on the needs of the load(s) 130 and the types and states of the electric power sources 120. In various embodiments, the electric power sources 120 can include one or more rechargeable batteries and one or more electric power generators. The electric power generators may include a homopolar generator (HPG), mechanical systems or rotary systems, and/or solar panels.

In some embodiments, the HPG is a direct current (DC) power generator. In certain embodiments, the HPG may include an electrically conductive disk rotating in a plane perpendicular to the uniform static magnetic field. While rotating, a voltage difference can be generated between the center of the disk and the rim of the disk. In other embodiments, the HPG includes a cylinder rotating in a plane perpendicular to the uniform magnetic field. While rotating, the voltage difference can be generated between the ends of the cylinder. In various embodiments of the disclosure, the electric power sources may include rechargeable batteries and banks of rechargeable batteries. In some embodiments, the controller 105 may configure switches and relays of the relay system 110 to connect rechargeable batteries in series when the rechargeable batteries are configured to provide power to the load(s) 130.

Figure 2:
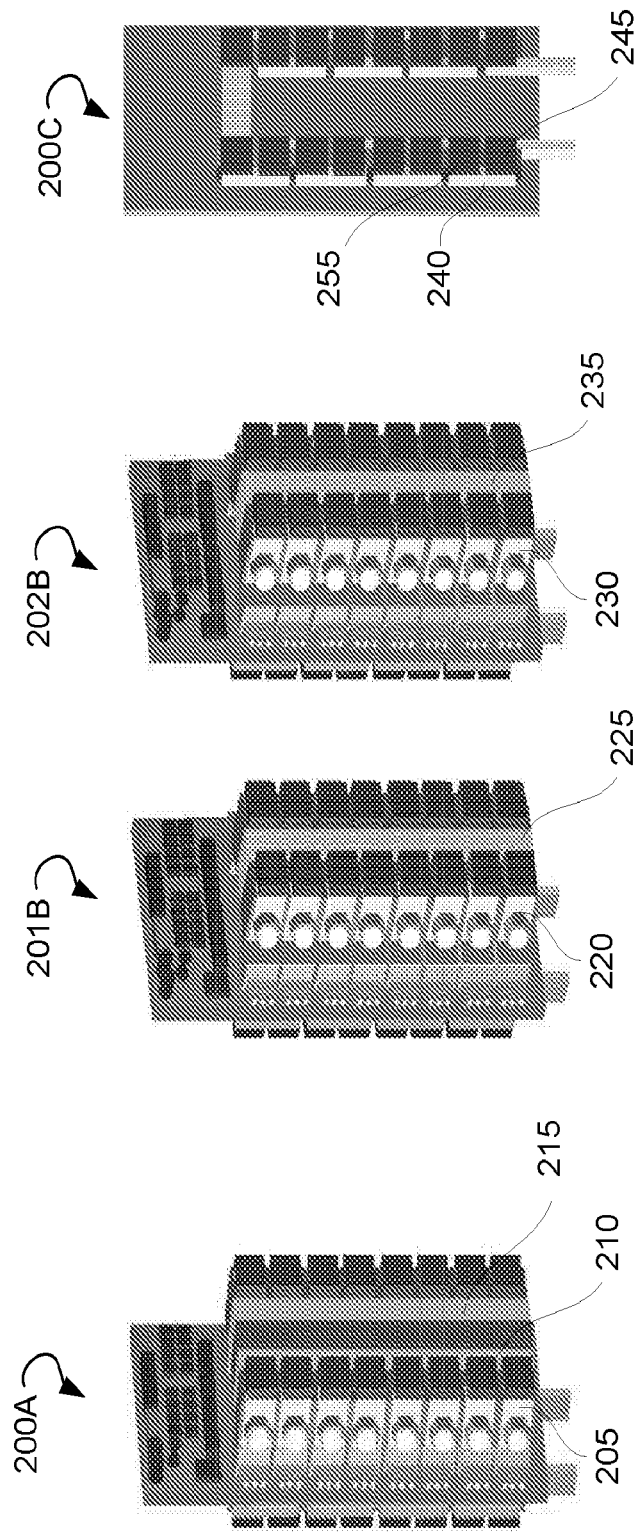
FIGS. 2A-2C illustrate example batteries which can be used in a system for dynamic control of configurations of electrical circuits, according to an embodiment of the disclosure.

In certain embodiments, the controller 105 can configure the switches and relays of the relay system 110 to connect rechargeable batteries in parallel to an electric power generator for recharging. In some embodiments of the disclosure, the relay system 110 can be used as a battery management system that can switch the batteries between in series and parallel configurations. In some embodiments, the batteries can be charged at their lowest voltage potential. The batteries can be discharged at a higher potential depending on the load on the system. FIGS. 2A-2B show example battery modules (also referred to as banks of batteries and/or cells) which can be used to implement dynamic control of configurations of electrical circuits, according to embodiments of the present disclosure.

In some example embodiments, illustrated in FIG. 2A, the battery module 200A can include batteries 205 and buses 210 and 215 configured to electrically couple the batteries. Some example embodiments of the disclosure may include battery modules 201B and 202B, where the battery module 201B includes batteries 220 and a single bus 225 connects the batteries 220. The battery module 202B may include batteries 230 and a single bus 235 connecting the batteries 230.

In some embodiments of the disclosure, a first copper bus may be attached to either the positive terminal or the negative terminal of the input power source. In various embodiments, the copper bus may include a metallic strip that conducts electric current within the battery bank. Even though in the illustrated embodiments of the present disclosure a copper bus is used for conducting electricity between battery banks, other embodiments may use a brass bus, an aluminum bus, or other buses made from other conducting materials. In various embodiments of the disclosure, the copper bus may include a flat strip, a solid rod, a solid or hollow tube, a braided wire, and so forth. In some embodiments, the copper bus may be supported by an insulator or insulation may surround the bus. An input power source can be used to recharge the batteries and can be running alongside a first relay. A second copper bus can be attached to the first relay. The second copper bus can be connected to either the positive terminal or the negative terminal of the battery being either charged or discharged. A metal-oxide-semiconductor field-effect transistor (MOSFET) can be mounted between the first copper bus of the input power source and the second copper bus attached to the first relay connected to the battery and separated by an insulator. A layout of a circuit connecting batteries, MOSFET(s), relay(s), and input power sources may vary and depend on the method of charge and the number of batteries. In some embodiments, two copper buses can be used per a battery module. In other embodiments, two separate copper buses can be used for two separate battery modules.

The gate of the MOSFET can be wired to the first relay and can be driven by a controller, for example, by a programmable microcontroller. The controller may run power to the first relay input so that when the first relay activates, it supplies a positive voltage to the gate of the MOSFET mounted on the first copper bus. When the first relay is inactive, it ties the gate back to the input power source ground or vice versa. The second copper bus can be mounted on the reverse side of the first relay and can be wired to a second relay. The second relay can be a mirror image of the first relay so that the first relay and the second relay cannot be in the same state at the same time. FIG. 2C shows an example battery module 200C. In the battery module 200C, the copper buses 240 positioned on the mirrored side of the upper relays can connect from the preceding batteries 245 negative to the subsequent batteries 255 positive with a MOSFET between. When the MOSFET is activated, it creates a series circuit between the batteries 245 and 255 in the battery module.

The first copper bus and the second copper bus can be connected from the one battery negative terminal to another battery positive terminal with a further MOSFET between the batteries. When the further MOSFET is activated, it creates an in series circuit between the batteries in the system.

The relay system can be controlled on both the positive and the negative sides of the circuit. In some embodiments, a positive bus can be used for controlling the system from the input power source. A diode can be placed between the grounds from the batteries back to a single bus tied to a common ground of the input source.

Figure 3:
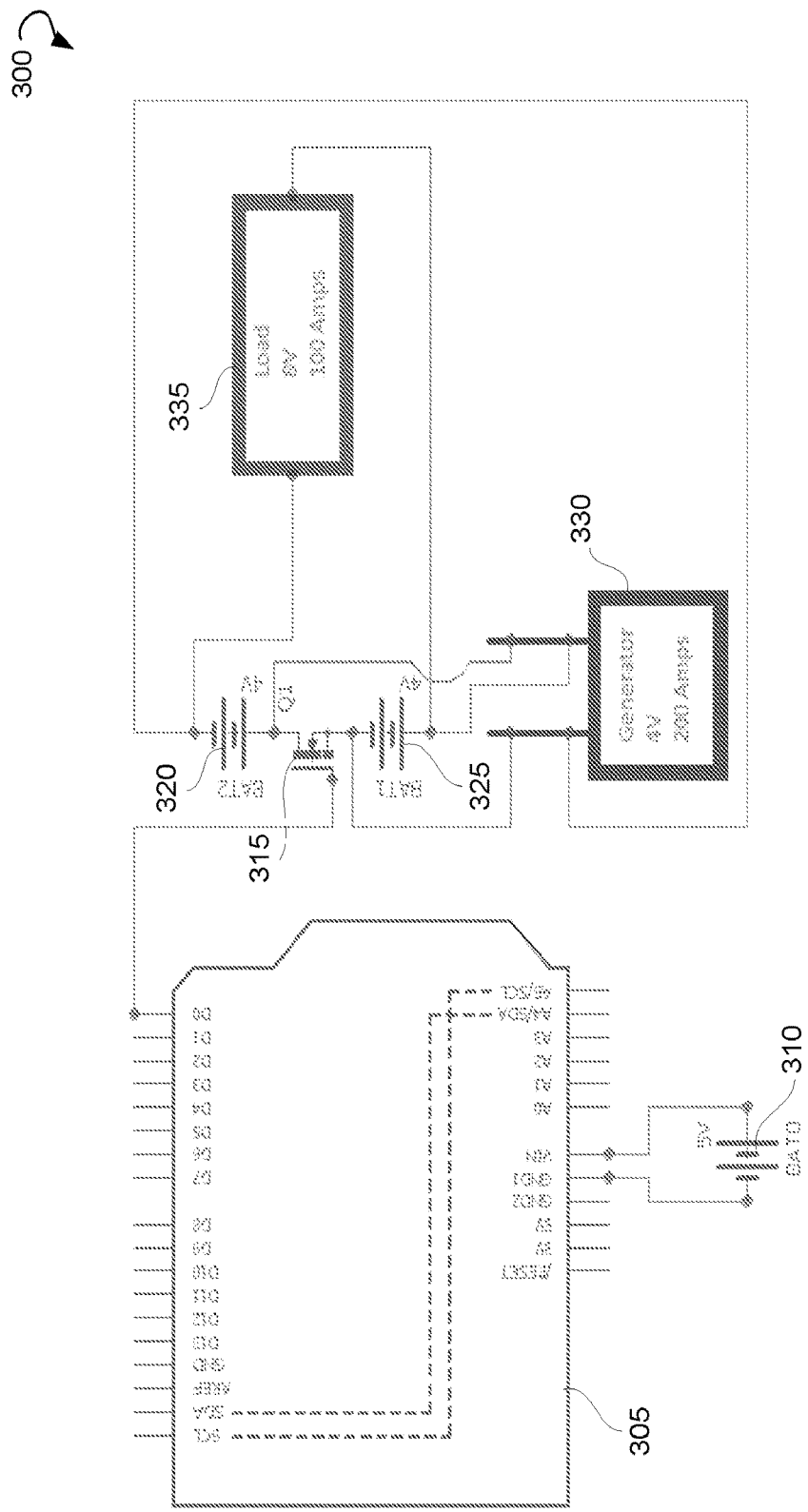
FIG. 3 illustrates an example electrical circuit, according to an embodiment of the disclosure.

FIG. 3 shows an example electrical circuit 300 that can be used for charging batteries in parallel and discharging batteries in series. The electrical circuit 300 may include a controller 305, one or more batteries 310, one or more transistors or MOSFETs 315, one or more rechargeable batteries 320 and 325, an optional solar panle or generator 330, and one or more loads 335. The battery 310 may be connected to the controller 305 and configured to provide power to the controller 305. The controller 305 may be connected to the MOSFET 315 and configured to control the MOSFET 315 by providing a voltage to the gate of the MOSFET 315. The MOSFET 315 may separate rechargeable batteries 320 and 325. When the voltage is provided to the gate of the MOSFET 315, the rechargeable batteries 320 and 325 are connected in series and provide power to the load 335. When the voltage is not provided to the gate of the MOSFET 315, the rechargeable batteries 320 and 325 are connected in parallel and may be recharged by power received from the generator 330.

Figure 4:
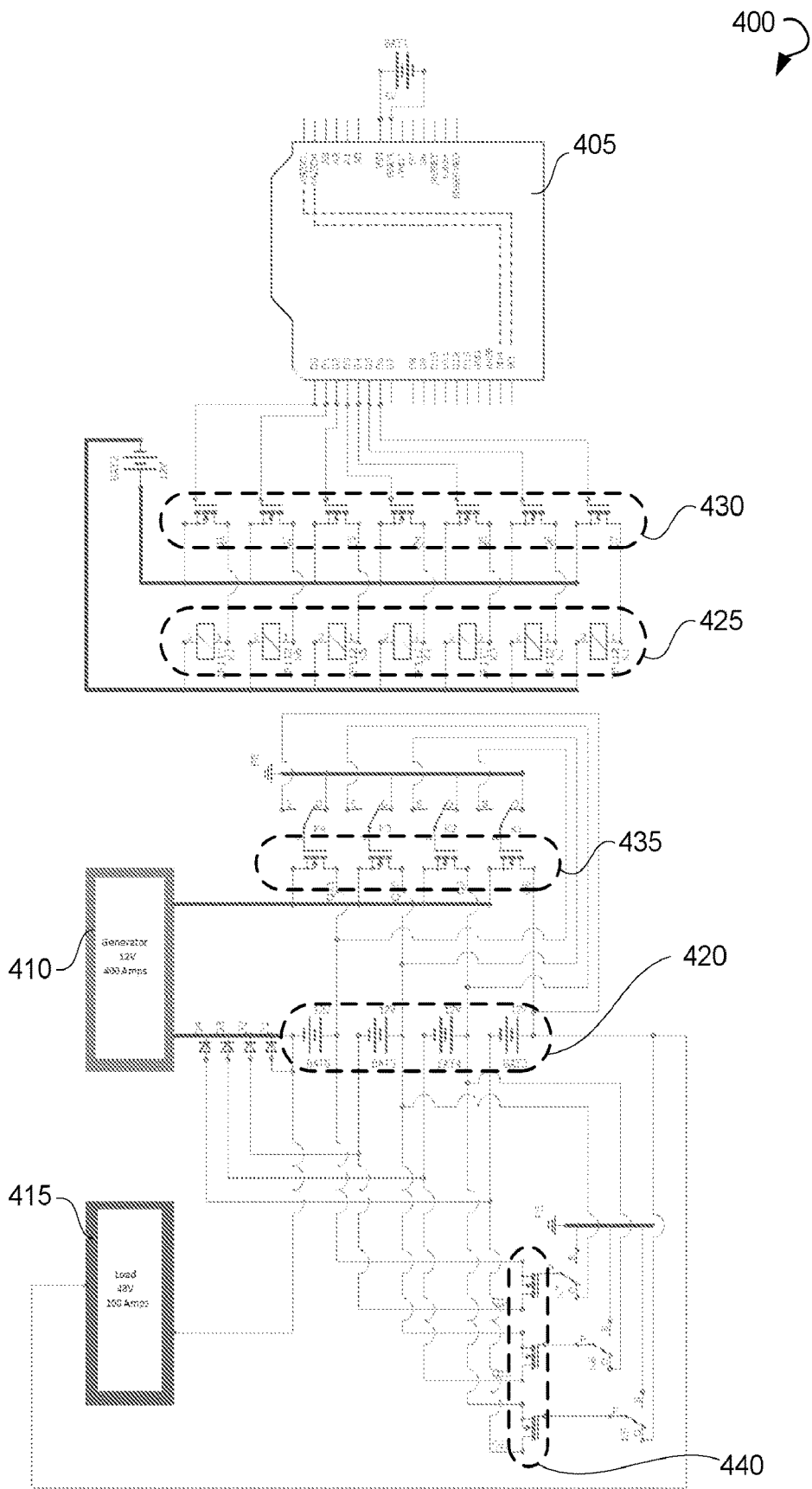
FIG. 4 illustrates an example electrical circuit, according to another embodiment of the disclosure.

FIG. 4 shows another example electrical circuit 400 for charging batteries in parallel and discharging batteries in series. The electrical circuit 400 includes one or more controllers 405, a optional solar panel or generator 410, one or more loads 415, one or more rechargeable batteries 420, one or more transistors or MOSFETs 430, 435, and 440, and one or more optional relays 425. The controller 405 may provide voltage to the gates of the MOSFETs 440 in order to connect the rechargeable batteries 420 in series and to force the rechargeable batteries 420 to provide power to the load 415. In an example shown in FIG. 4, each battery is of 12 volts resulting in a total output of 48 volts that can be provided to the load 415. When the controller 405 does not provide voltage to the MOSFETs 440, the rechargeable batteries 420 are isolated from each other. If the rechargeable batteries 420 are isolated from each other, the controller 405 may provide voltage to the MOSFETs 435 to connect the rechargeable batteries 420 to the generator 410 in parallel for recharging. In the depicted example of FIG. 4, the rechargeable batteries 420 can be charged at 12 volts, or any suitable voltage.

Example Vehicle Batteries Control

Figure 5:
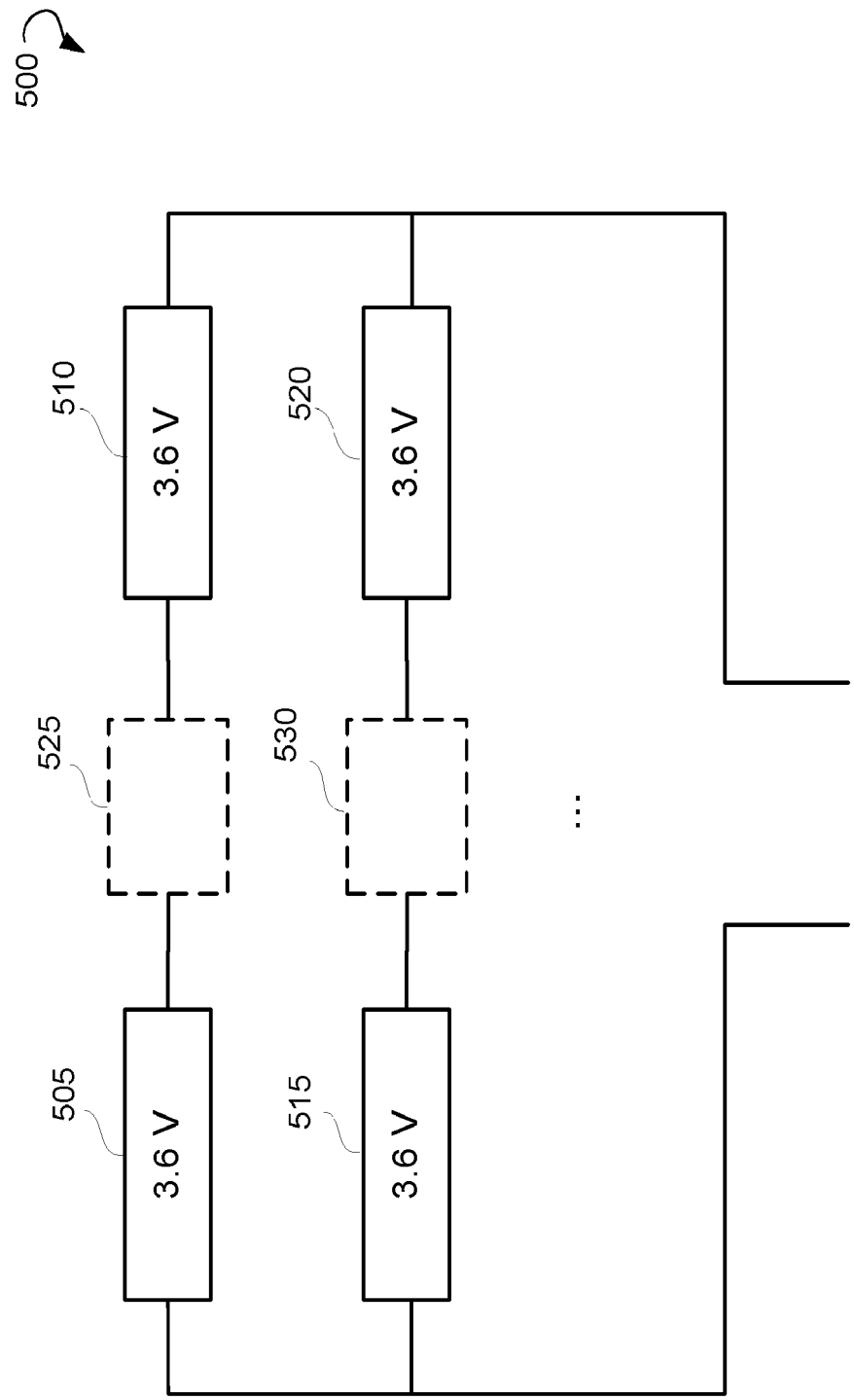
FIG. 5 illustrates an example system for dynamic control of configurations of electrical circuits, according to an embodiment of the disclosure.

FIG. 5 is a block diagram showing an example power bank 500, which can be used to implement a method for dynamic control of a configuration of electrical circuits. The example bank 500 can include four batteries 505, 510, 515, and 520. Battery 505 and battery 510 can be connected in a first series and battery 515 and battery 520 can be connected in a second series. The first series and the second series can be connected in parallel. If each of the batteries 505-520 is of 3.6 volts, the bank 500 produces 7.2 volts. The bank 500 may be used in a vehicle with an inverter.

In an example embodiment of the disclosure, the bank 500 can be modified. MOSFETs 525 and 530 can be added to separate each pair of the batteries connected in series. When a MOSFET separates a pair of the batteries, the batteries in the pair can be charged in parallel. Some embodiments may include a controller configured to rotate a portion of the bank 500 from charge to discharge. The controller may be further configured to attach or electrically couple the portion to the bank at the inverter to offset an ampere load while the vehicle is in motion. In some embodiments, the bank 500 or a section of the bank 500, once charged, can be switched back to an in series connection between the pairs of batteries.

In other embodiments of the disclosure, when discharging, a current can range from 30 to 60 amperes at 350 to 400 volts. This current amounts to a discharge of about 12 kilowatts. Such current can be handled, for example, by 300 ampere MOSFETs mounted on the battery jumpers or connectors. Each bus in the bank can be split and bridged with one or more MOSFET chips. Each of the MOSFET chips can only carry voltage and amperage from one battery to the next battery, and not from the entire series of batteries.

In another embodiment of the disclosure, a factory battery bank installed in a vehicle can be left unmodified. An on-board management system of the vehicle can maintain and/or manage performance of the factory bank. Additional batteries can be added to the factory battery bank to increase the total capacity upon request. A relay system including a set of MOSFETs and relays can be used to connect the factory bank and the additional batteries. For example, a small 48-volt bank can be added and a 48-volt alternator can be added to the drive axle of a vehicle to maintain the additional batteries. It is a known issue with electrical vehicle (EV) systems that the battery voltage can decline. A relay system can be used to add volts to a volt bank temporarily. In some examples, the relay system may be used to connect additional volts banks to an electrical motor of the EV temporarily. In some embodiments, a volts bank can be added during a decrease in the voltage of the factory bank to maintain the highest efficiency and maximum power. For example, a 48-volt bank can be added while the vehicle is being driven in stop and go traffic.

In some other embodiments, the controller can be configured to determine what sections or cells of the battery bank to charge and discharge based on the battery section voltage. In certain embodiments, any battery in the bank can be charged in real time (in parallel) while the controller keeps the highest voltage batteries in series.

In yet another embodiment of the disclosure, a system of batteries of an electric vehicle can include a first battery bank that can produce about 300 volts in series. The system may further include a second battery bank that can produce about 300 volts in series. The first battery bank and the second battery bank connected in series can then produce about 600 volts. When the vehicle is at a cruising speed, it may only need one 300-volt bank, and the other 300-volt bank can be charged in parallel. Depending on the capabilities of a motor of the vehicle, all 600 volts could be used at once to double the output during an increase in the load.

During a decrease in the load, one of the banks can be switched to recharging in parallel. Thus, one of the banks can be supercharged temporarily for extra power. While the vehicle is at a cruising speed, the controller can determine which batteries are not needed to be connected to a load in series. These batteries can be switched from being discharged in series to being charged in parallel.

In some embodiments, an output of the battery banks can also be controlled by varying the voltage on the gates of all MOSFETs used to isolate batteries at the same time. When more voltage is provided to the gates, more current can pass through the MOSFETs. Therefore, high current MOSFETs can be used like variable resistors. The entire series can be very accurately controlled using the gates of the MOSFETs. This method of controlling the output can be used to operate direct current (DC) motors. This method can also be adapted to operate a variable frequency drive.

In some embodiments, a controller area network (CAN) can be used to control switching from an in series arrangement to a parallel arrangement in a battery bank. In certain embodiments, the CAN may be added to a control bus connecting batteries in a battery bank. A receiver can be added at the end of the bus. The receiver can be configured to provide reports back to the controller. Each battery in the bank can be associated with an identifier (ID). Chips identifying each of the batteries and chips identifying MOSFETs isolating the batteries can be placed on the same bus. The controller can be configured to determine each individual voltage per battery and determine whether an individual battery should be charged or discharged. Based on the determination, the controller may connect some individual batteries for charging while maintaining only the needed series of batteries for the real time load on the motor.

In some embodiments, the CAN may be configured to determine a charge rate or a discharge rate for each battery in the bank. In certain embodiments, the CAN may be configured to monitor the health of a battery or a MOSFET. If the battery or the MOSFET fails, it can be disconnected with a minimal impact on the output of the battery bank.

In various embodiments, the CAN may be utilized for battery and battery system management. The CAN may be added as a third system that can communicate with other battery systems in real time. The CAN may use input values from other network input sensors to make decisions concerning the best use of the battery bank. Thus, the CAN may reduce wiring.

Certain embodiments may be configured to change battery potentials through the lowest common denominator of a battery pack. For example, a vehicle battery pack can be 16 sets of 48 volts. Any vehicle that has batteries could also be configured to use negative torque control similar to ABS. Such embodiments can work on differentials that can divert torque in a drive mode scenario the reverse would happen in a braking event. Other methods may include limiting positive torque to wheels. This is traction control. In the same way this works the back emf from motors could be used in a negative form of torque control enhancing how Traction control and ABS functions. Such embodiments provide the added ability to recover energy from the vehicle, enhancing safety systems and another level of control over the various traction control and torque control works in conjunction with each other.

Example Alternative Current Generation

In some other embodiments, a relay system including MOSFETs can be used to generate alternative current using a battery bank. For example, a system may include two banks with MOSFETs. A controller may be configured to switch either the two banks or batteries of the bank between positive and negative buses using the MOSFETs. In certain embodiments, the MOSFETs can be switched at 60 hertz or at another predetermined frequency (e.g., 70 hertz, 120 hertz, and/or the like). In some implementations, the system may include a plurality of banks with MOSFETs. The operation may be generally similar to the operations described herein.

Example Solar System Control

Solar panels include voltage and current sources dependent on the magnitude of photons interacting with silicon. In some embodiments, a battery bank can be connected to a solar panel array. In some embodiments, the batteries in a bank can be switched from parallel to in series connection.

In various embodiments, a relay system can be used as a smart controller to optimize the power being generated by an array of solar panels. When sensors detect that a panel is no longer generating a desired voltage, the relay system can disable the panel or a section of the array, thereby keeping the panel or the section from causing resistance across the array and improving the performance of the system.

FIG. 6 is a block diagram showing two configurations 600A and 600B of a solar panel system, according to some example embodiments. The illustrated solar system includes two solar panels 605 and 610 and two battery banks 615 and 620. In configuration 600A, the battery banks 615 and 620 are connected in parallel. Solar panels 605 and 610 can be also connected in parallel in configuration 600A. Thus, one panel can be configured to charge one battery. Charging in parallel is considerably faster than in series because since the current may not be impeded by the cumulative resistance of the string of batteries. The resistance of batteries may reduce the charging time.

In configuration 600B, the battery banks 615 and 620 are switched to an in series arrangement. Solar panels 605 and 610 can be switched to an in series arrangement and coupled to the battery banks. This arrangement can result in a high potential in the panels. Solar panels 605 and 610 can be connected to a load 630 and provide current to the load 630 to directly reduce the load on the battery banks 615 and 620. In some embodiments, the system may connect the rechargeable batteries in series when the power output of the solar panel system is less than a system voltage of the rechargeable batteries. For example, if the power output is 2 volts, and the system voltage is 5 volts, the batteries may be connected in a series configuration. In another example, the system may connect the rechargeable batteries in parallel when the power output of the solar panel system is greater than the system voltage of the rechargeable batteries, such that the batteries may charge in parallel, which may reduce overall charge times for the system.

In some embodiments, a relay system can be configured to switch between different configurations of a solar panel array based on the load of the solar panels, the amount of sunlight received by each of the panels, am ambient temperature, an ambient humidity, a temperature of one or more of the solar panels or system, and/or the amount of the charge of the batteries. When fully charged in parallel, the batteries can switch to an in series arrangement to maintain the charge while the solar panel system is idle or under a low load. In some embodiments, when solar panels are under a high load, the solar panels can be switched back to the parallel mode, but the batteries may remain connected in series.

In some embodiments, to prevent discharging of the batteries into the solar cells during an absence of solar activity, a smart bypass diode can be placed between each battery and each solar panel.

In some embodiments, a relay system can be used as a maximum power point tracking (MPPT) controller in a solar panel system or another system including a generator and battery banks. The relay system can configure a connection between solar panels and battery banks to maximize a power point transfer between the solar panels and the battery banks. In some other embodiments, a relay system may configure a connection between a generator and battery banks to maximize the power transfer from the generator and the battery banks to a load.

Example Relays and Switches

In some embodiments of the disclosure, a mechanical device can be used to change a configuration of a connection between different electrical power sources or groups of electrical power sources. In some embodiments of the disclosure, the mechanical device may include at least a housing, a cylinder, and a shaft.

Figure 7:
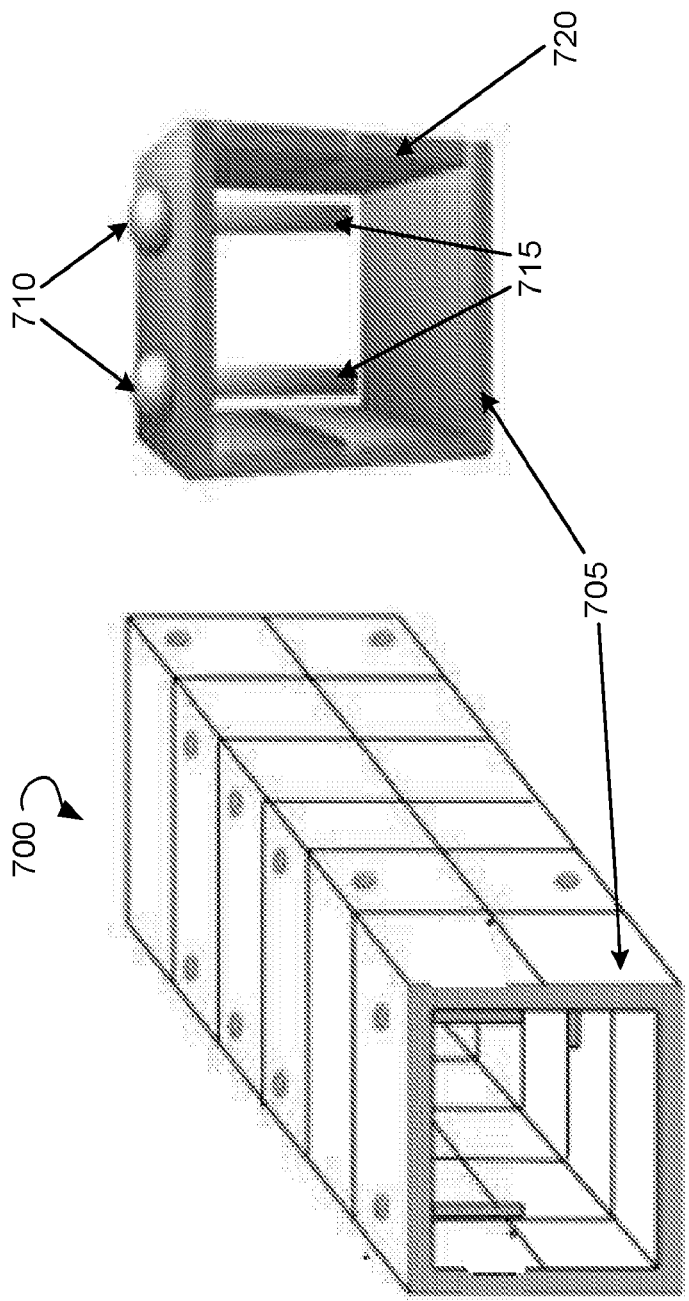
FIG. 7 illustrates a housing of a mechanical device for switching configurations of electrical circuits, according to some example embodiments of the disclosure.

FIG. 7 shows an example housing 700 of a mechanical device for switching configurations of electrical circuits. The housing 700 may include one or more housing modules 705 stacked on each other to form the housing 700. The housing module 705 may include a supporting structure 720, screw terminals 710 outside of the supporting structure 720, and "arms" 715 inside the supporting structure 720. In some embodiments of the disclosure, other electrical connectors can be used instead of the screw terminals 710 to join the electrical terminals of the elements in the electrical circuits.

Figure 8:
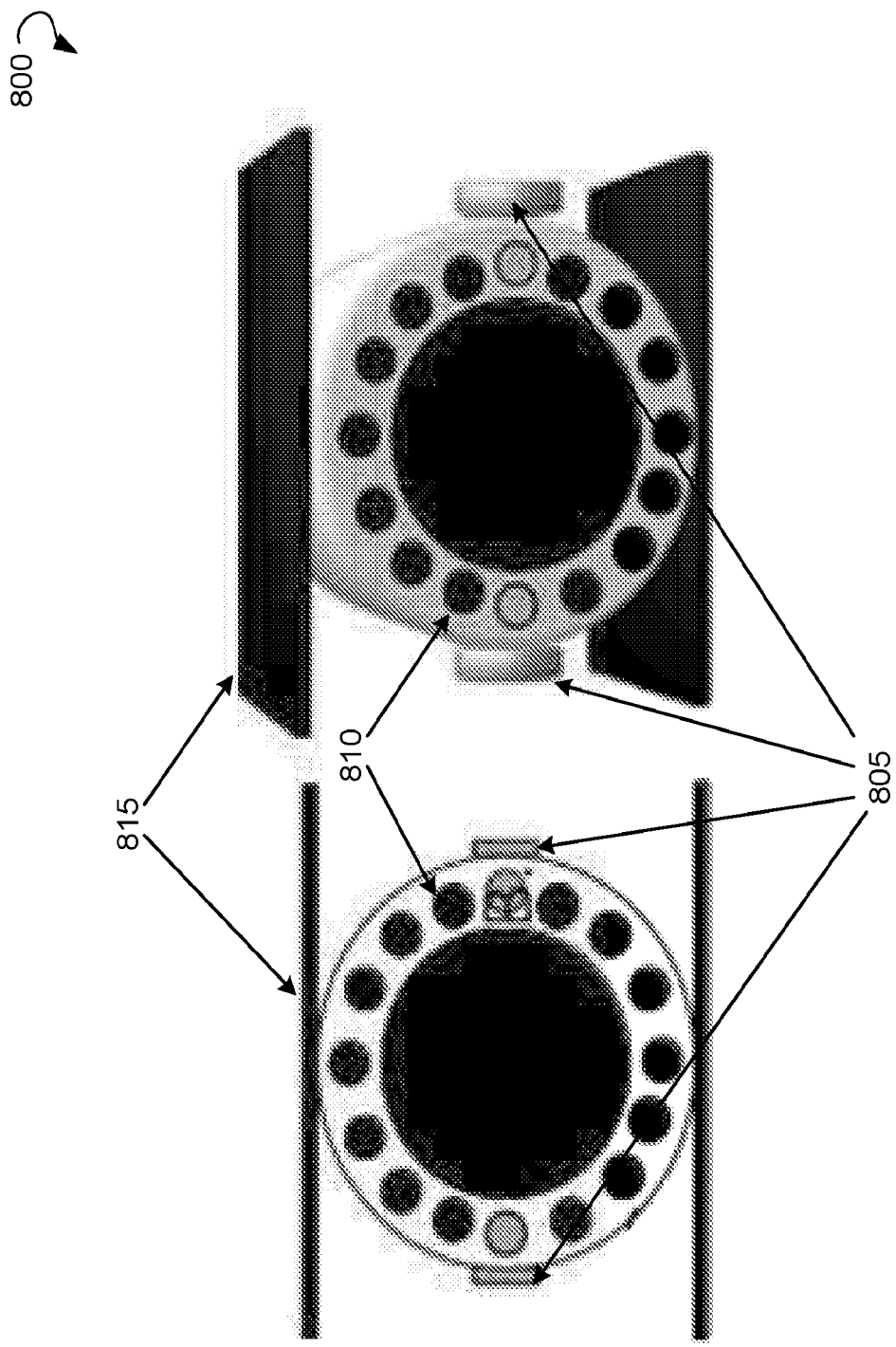
FIG. 8 illustrates a cylinder module of a mechanical device for switching configurations of electrical circuits, according to some example embodiments of the disclosure.

FIG. 8 is a left front view and a top right perspective view of an example cylinder module 800 of a mechanical device for switching configurations of electrical circuits, according to some example embodiments. In some embodiments, one or more cylinder modules 800 can be stacked together to form a single cylinder for the mechanical device for switching configurations of the connection in the electrical circuits. The cylinder module 800 may include two sets of holes. The first set of holes can be drilled on the outer surface of the cylinder surface and configured to accept contacts 805. Holes 810 of the second set of holes can be drilled inside the body of the cylinder module 800 at different angles with respect to the rotation axis of the module. Some of the holes 810 may route wires from the contacts 805. Some other holes 810 may be configured to allow stacking of the cylinder modules 800. The posts 815 can be configured to align the cylinder module(s) 800 inside the housing module(s) 705 such that the "arms" 715 align with the contacts 805 on the surface of the cylinder module(s) 800.

In some embodiments, the "arms" 715 can be configured to be magnetically drawn in by magnets or electromagnetic coils similar to latching relay switches. In some embodiments, when an "arm" is drawn in, an electrical connection can be enabled between a screw terminal attached to the "arm" and one of the contacts 805 to which the "arm" is aligned to. In certain embodiments of the disclosure, the two contacts 805 located on the same cylinder module may not be enabled at the same time. In some embodiments, the contacts 805 along the cylinder can be divided in groups, wherein all contacts within the same group are either enabled or switched off at the same time. This arrangement may allow changing the configuration of the connection between the elements of an electrical circuit, where the contacts 805 and the screw terminals 710 are used to connect the elements.

Figure 9:
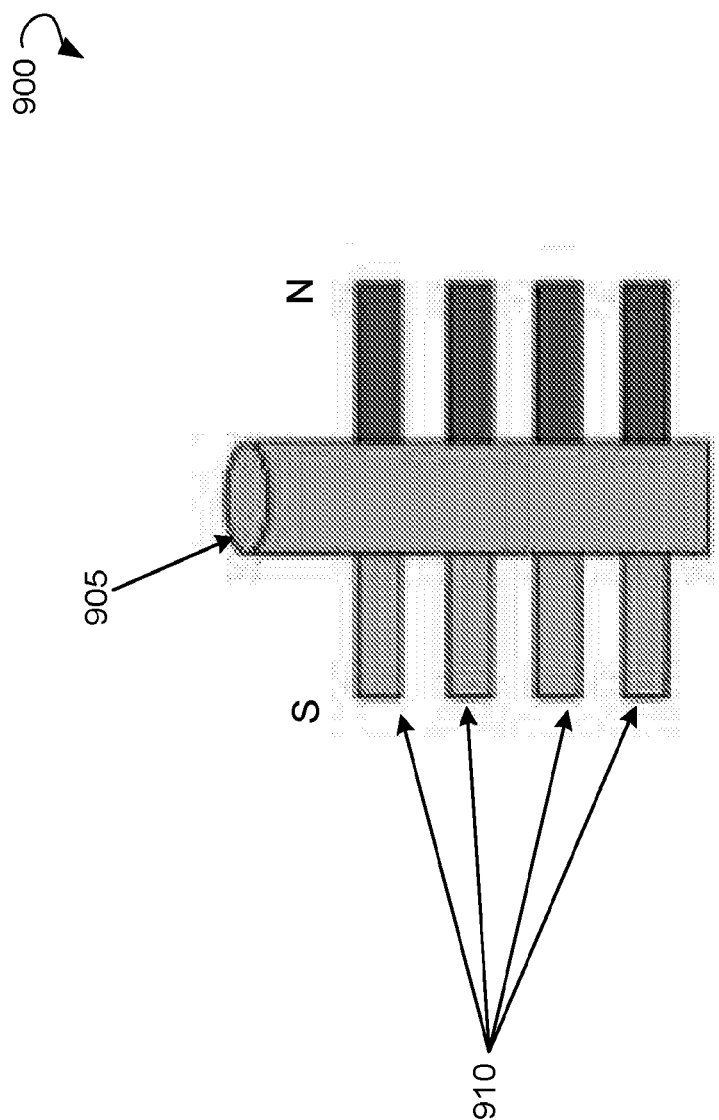
FIG. 9 illustrates a shaft of a mechanical device for switching configurations of electrical circuits, according to some example embodiments of the disclosure.

FIG. 9 shows an example shaft of a mechanical device for switching configurations in electrical circuits, according to some example embodiments of the disclosure. The shaft 900 may include a rod 905 and magnets 910 embedded in the rod 905. In certain embodiments of the disclosure, the magnets 910 can be embedded in such a way that south poles of the magnets 910 are arranged at one site and north poles of the magnets 910 are arranged on the opposite site of the rod 905. In certain embodiments of the disclosure, the shaft 900 can be placed inside the cylinder of the mechanical device. In some embodiments of the disclosure, a motor can be configured to rotate the shaft 900 in order to select a group of contacts 805 to be enabled. In some embodiments, after rotating the shaft 900, the north pole of one of the magnet(s) 910 embedded in the shaft aligns with one of the contact(s) 805, and the magnet can force an "arm" aligned to the contact 805 to be drawn in and thereby enable an electrical connection between a screw terminal aligned to the "arm" and the contact 805. In certain embodiments of the disclosure, a number of magnets embedded in the shaft 900 may be equal to a number of cylinder modules 800 and a number of housing modules 705 in the mechanical device. In certain embodiments of the disclosure, electromagnetic coils may be used to perform the functions of the magnets 910.

In some other embodiments of the disclosure, a rotary switch device can be used to selectively control battery charging in a battery bank. The rotary switch device can be configured to isolate the batteries and/or switch between series and parallel electrical circuits for connecting the batteries. In some embodiments of the disclosure, the rotary switch can include an outer tube and an inner spindle. The inner spindle can include a number of positive or negative button contacts, both in the circumferential and longitudinal directions. The button contacts can be configured to match with various positions on the outer tube. In some embodiments, the inner spindle can be rotated to switch between series and parallel electrical circuits. In certain embodiments, the inner spindle can be displaced along the longitudinal axis with respect to the outer tube to switch between series and parallel electrical circuits. In some embodiments, battery terminals can be connected to the positions on the outer tube. Using the rotary switch provides for high current capacity and low resistance.

In some embodiments of the disclosure, the inner spindle and the outer tube can be separated by a fluid such as an inert gas or oil to reduce arcing. In certain embodiments, the inner spindle and the outer tube can be separated by gallium used in a wet contact system. In some embodiments, the rotary switch device can also include magnetic latches configured to lock the rotary switch into a particular configuration. In some embodiments of the disclosure, a stepper motor can be used to rotate the inner spindle. In some embodiments of the disclosure, a screw ball can be used to displace the inner spindle along the longitudinal axis.

Computing Device

Figure 10:
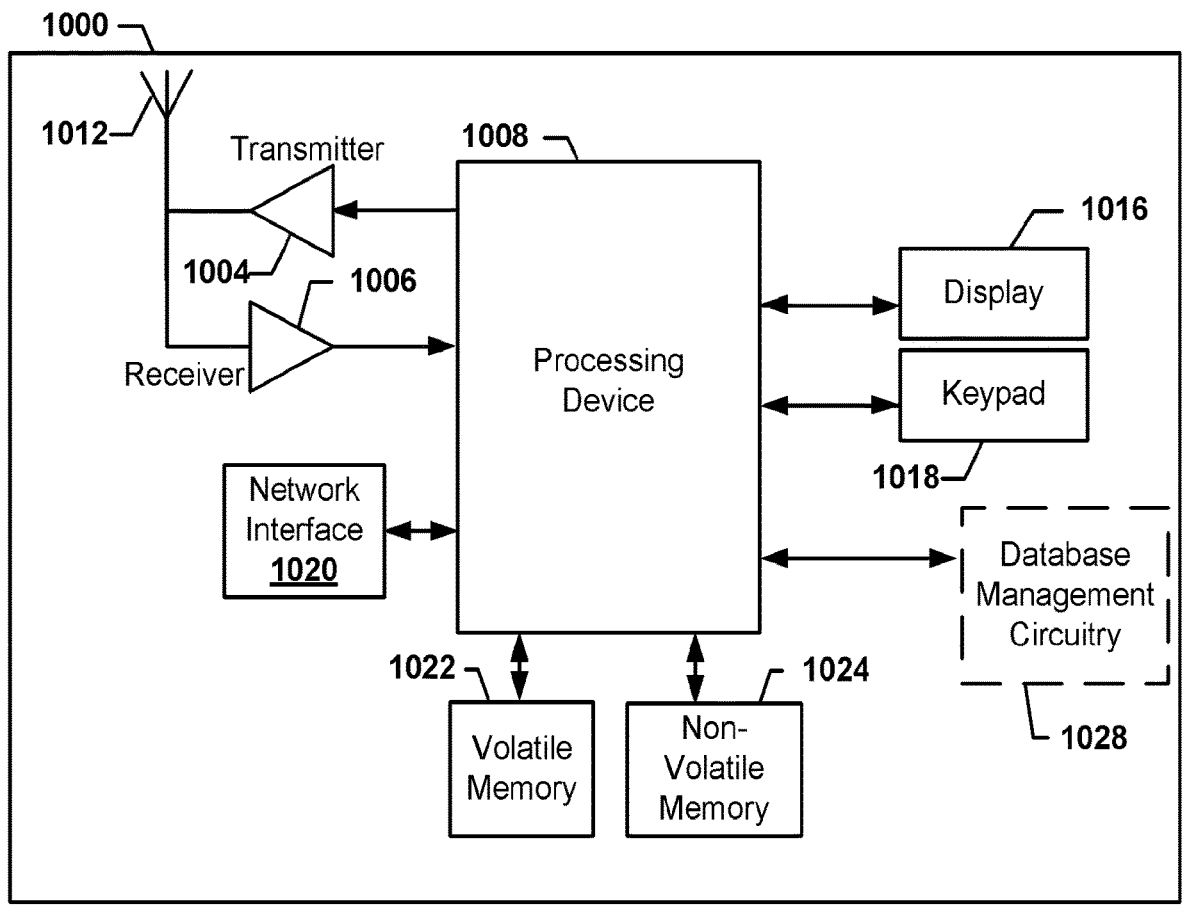
FIG. 10 illustrates an example schematic diagram of a computing device and/or entity, according to some example embodiments of the disclosure.

FIG. 10 illustrates an example schematic diagram of a computing device 1000 and/or entity according to some example embodiments of the disclosure. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The computing device 1000 can be operated by various parties and/or automatically. As shown in FIG. 10, the computing device 1000 can include an antenna 1012, a transmitter 1004 (e.g., radio), a receiver 1006 (e.g., radio), and a processing device 1008 (e.g., CPLDs, microprocessors, multi-core processors, co-processing entities, ASIPs, microcontrollers, and/or controllers) that provides signals to and receives signals from the transmitter 1004 and the receiver 1006, respectively.

The signals provided to and received from the transmitter 1004 and the receiver 1006, respectively, may include signaling information in accordance with air interface standards of applicable wireless systems. In this regard, the computing device 1000 may be capable of operating with one or more air interface standards, communication protocols, modulation types, and access types. More particularly, the computing device 1000 may operate in accordance with any of a number of wireless communication standards and protocols. In a particular embodiment, the computing device 1000 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 1000 may operate in accordance with multiple wired communication standards and protocols, via a network interface 1020.

Via these communication standards and protocols, the computing device 1000 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 1000 can also download changes, add-ons, and updates, for instance, to its firmware, software (e.g., including executable instructions, applications, program modules), and operating system.

According to one embodiment, the computing device 1000 may include location determining aspects, devices, modules, functionalities, and/or similar words used herein interchangeably. For example, the computing device 1000 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 1000 position in connection with a variety of other systems, including cellular towers, Wi-Fi access points, and/or the like. Similarly, the computing device 1000 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 1000 may also comprise a user interface (that can include a display 1016 coupled to a processing device 1008) and/or a user input interface (coupled to a processing device 1008). For example, the user interface may be a user application, a browser, a user interface, and/or similar words used herein interchangeably executing on and/or accessible via the computing device 1000 to interact with and/or cause the display of information. The user input interface can comprise any of a number of devices or interfaces allowing the computing device 1000 to receive data, such as a keypad 1018 (hard or soft), a touch display, voice/speech or motion interfaces, or other input devices. In embodiments including a keypad 1018, the keypad 1018 can include (or cause the display of) the conventional numeric (0-9) and related keys (#, *), and other keys used for operating the computing device 1000 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 1000 can also include volatile memory 1022 and/or non-volatile memory 1024, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 1000. As indicated, this may include a user application that is resident on the respective device or accessible through a browser or other user interface for communicating with various other computing entities. As will be recognized, these architectures and descriptions are provided for example purposes only and are not limited to the various embodiments.

The computing device 1000 may optionally include database management circuitry 1028. In one implementation, the database management circuitry 1028 may be embodied as software executed on the processing device 1008. In a different implementation, the database management circuitry 1028 may be a processing device in communication with the processing device 1008. The database management circuitry 1028 may be responsible for managing one or more databases. In one implementation, the database management circuitry 1028 may store and maintain a tree (e.g., b-tree and/or the like) in association with each database. For example, the tree may be used by the database management circuitry 1028 to facilitate searching for data in a database. The database management circuitry 1028 may receive and process search requests via the network interface 1020.

Illustrative Processes

Figure 11:
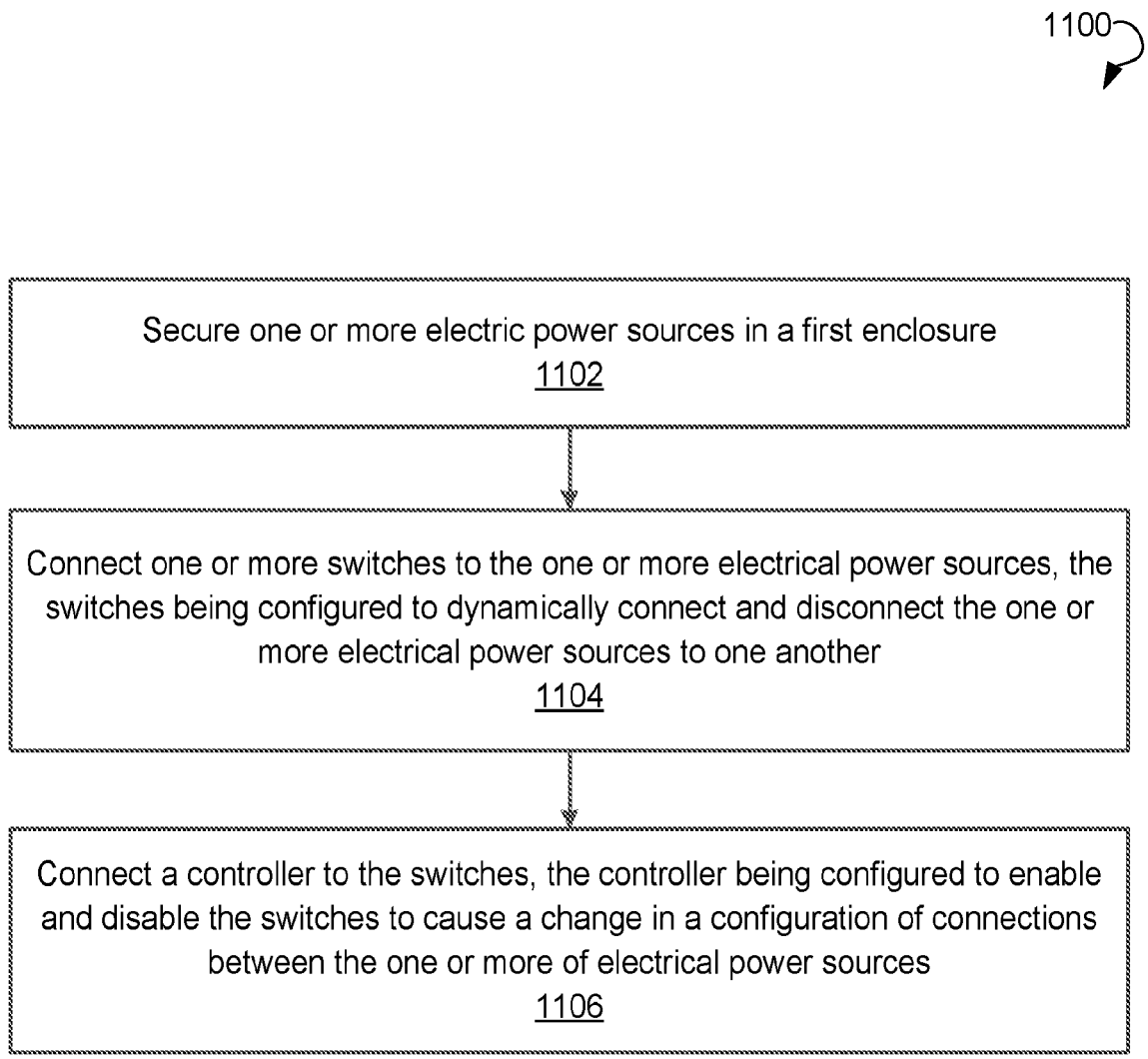

FIG. 11 is a flow chart illustrating an example process 1100 for dynamic control of configurations of electrical circuits. The method may begin with securing one or more electric power sources, such as rechargeable batteries, in a first enclosure (1102). The electric power sources may include solar panels and HPGs as well as batteries and banks of batteries. For example, a plurality of battery banks may be secured in a vehicle engine compartment. In a different example, a plurality of lithium ion battery banks may be secured within a phone or a tablet enclosure. In a different example, one or more solar panels may be secured or mounted on a building and/or a building's rooftop.

The process 1100 may continue with connecting one or more switches to the one or more electrical power sources, the switches being configured to dynamically connect and disconnect the one or more electrical power sources to one another (1104). The switches can be configured to connect and disconnect some of the electric power sources. The switches may include transistors and electromechanical switches. In one example, the switches may be coupled to the power sources to allow the switches to change the configuration of the connections between the power sources.

The process 1100 may proceed with connecting a controller to the switches, the controller being configured to enable and disable the switches to cause a change in a configuration of the connections between the one or more electric power sources (1106). For example, the controller can be configured to turn on and/or off the switches to cause a change in a configuration of the connections between the electric power sources. In one example, some of the electric power sources connected in series can be switched to a parallel connection and, vice versa, some of the electric power sources connected in parallel can be switched to an in series connection. The controller may be a computing device or a processor as described herein. The controller may dynamically and selectively change the connection configuration of the power sources according to one or more criteria. In one example, the criteria may be based on the load and/or power consumption of a device being powered. In a different example, the criteria may be based on whether the device is being charged or consuming power.

Figure 12:
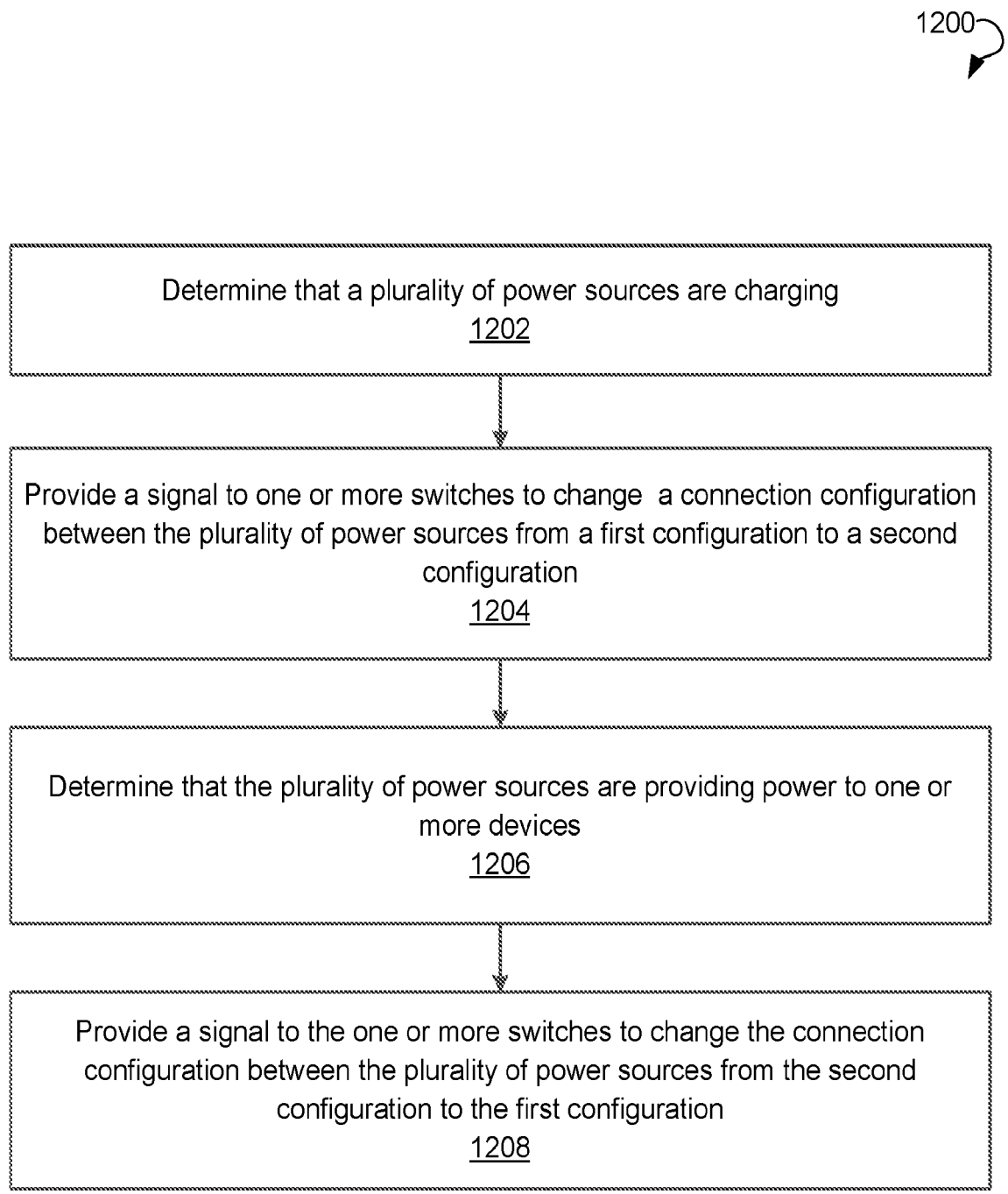

FIG. 12 is a flow chart illustrating an example process 1200 for dynamic control of configurations of electrical circuits. In one example, the process 1100 may optionally continue with the process 1200. The method may begin with determining that a plurality of power sources are being charged (1202). For example, the process 1200 may determine that an electric vehicle battery and/or battery banks are being charged. In a different example, the process 1200 may determine that a tablet or a cell phone lithium ion battery and/or battery banks are being charged. Yet in a different example, the process 1200 may determine that one or more solar panels are being charged. In one example, a processor and/or a computing device as described herein may perform the operations of the process 1200.

The process 1200 may continue with providing a signal to one or more switches to change a connection configuration between the plurality of power sources from a first configuration to a second configuration (1204). For example, a computing device may provide a signal to the switches to change the connections between the power sources from a series connection to a parallel connection based on or responsive to determining that the power sources are charging. As described herein this may facilitate improved and more efficient charging.

In turn, the process 1200 may continue with determining that the plurality of power sources are providing power to one or more devices (1206). For example, the computing system may determine that the battery banks are providing power to the electrical vehicle. Similarly, the computing system may determine that solar panels are actively providing power to a house. One or more sensors may be used to determine whether the power sources are charging. In one example, a sensor may monitor the power levels of the battery banks of an electrical vehicle. In a different example, a sensor may monitor whether a phone or a tablet is plugged in for charging.

The process 1200 may continue with providing a signal to the one or more switches to change the connection configuration between the plurality of power sources from the second configuration to the first configuration (1208). For example, a computing device may provide a signal to the switches to revert the connection between the power sources from parallel to series. As described herein, this may facilitate improved and more efficient power transfer. As described above, the MPPT may be used to maximize power transfer.

FIG. 13 is a flow chart illustrating an example process 1300 for dynamic control of configurations of electrical circuits. The process 1300 may optionally continue with the steps of processes 1100 and/or 1200. The process 1300 may begin with determining that a load of an electrical device coupled to a first battery bank and a second battery bank exceeds a first threshold (1302). For example, a computing device may determine that the load on an electrical vehicle increased past a first threshold. For example, during stop and go traffic or during fast acceleration, an electrical vehicle load may increase. In some examples, the load may meet or exceed a pre-specified threshold. The pre-specified threshold may be determined based on the electrical vehicle's average power consumption. In turn, the process 1300 may continue with providing a signal to one or more switches to change a connection configuration between the first battery bank and the second battery bank to cause the first and second battery banks to provide power to the electrical device simultaneously (1304). For example, the computing system may provide a signal to the switches to cause the switches to connect the first battery bank in series with the second battery bank. In some examples, this may double the output of the battery banks. For example, if the first battery bank provided 300 volts while the second battery bank provided 300 volts, the overall output with this configuration may be 600 volts.

In turn, the process 1300 may continue with determining that the load of the electrical device fails to meet the first threshold (1306). For example, the computing device may determine that the load or power consumption of the electrical vehicle fell below the threshold. For example, the vehicle may be at a steady state on a highway or the like.

The process 1300 may then continue with providing a signal to the one or more switches to change the connection configuration between the first battery bank and the second battery bank such that the first battery bank provides power to the electrical device while the second battery bank is being charged (1308). For example, the computing device may revert the configuration of the battery banks such that the first bank supplies power to the electrical vehicle while the second bank is charged in parallel. Similar steps may be applied for battery banks of cell phones and/or tablets as well as solar panels.

It should be understood that the processes, operations, and functionality described above may be implemented in a plurality of systems. For example, the processes, operations, and functionality above may be implemented in external and/or internal systems. Similarly, the processes, operations, and functionality above may be implemented in a display device such as a television, a monitor, a laptop, a tablet, a mobile phone, a gaming console, and/or the like.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device (e.g., computing device, mobile device, server and/or the like) has been described above, implementations of the subject matter and the functional operations described herein can be implemented in other types of digital electronic circuitry, or in computer software, firmware, or hardware, including the structures disclosed in this specification and their structural equivalents, or in combinations of one or more of them. For example, one embodiment described herein may be implemented by a plurality of servers, computing devices, mobile devices, servers, hardware, software, and/or any combination thereof.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory, extended memory or any combination thereof. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system for dynamic control of electrical circuit configurations, the system comprising:
   a plurality of rechargeable batteries comprising a first rechargeable battery and a second rechargeable battery;
   a plurality of switches, the plurality of switches being configured to:
   i) connect and disconnect at least some of the plurality of rechargeable batteries from each other, and
   ii) modify a connection between at least some of the plurality of rechargeable batteries between a series connection and a parallel connection, the plurality of switches comprising a first transistor positioned in between the first rechargeable battery and the second rechargeable battery arranged in series;
   a load coupled to an anode of the first rechargeable battery and a cathode of the second rechargeable battery; and
   a controller coupled to the plurality of switches, the controller being configured to enable and disable the plurality of switches to cause a change in a configuration of connections between the plurality of rechargeable batteries;
   wherein the plurality of rechargeable batteries are recharged at the lowest voltage capacity associated with the plurality of rechargeable batteries.

2. The system of claim 1, wherein the plurality of switches is a plurality of transistors.

3. The system of claim 2, wherein the plurality of switches includes a metal-oxide-semiconductor field-effect transistor.

4. The system of claim 1, wherein the plurality of switches include at least one electromechanical switch.

5. The system of claim 1, wherein the change in the configuration includes at least one of the following:
change of a connection of at least two of the plurality of rechargeable batteries from in series to in parallel; and
change of a connection of the at least two of the plurality of rechargeable batteries from in parallel to in series.

6. The system of claim 1, wherein the plurality of rechargeable batteries are connected into an array and wherein the controller configured to cause a change in the configuration is further configured to:
determine that voltage of at least one of the plurality of rechargeable batteries is less than a predetermined value; and
based on the determination, cause the switches to disconnect the at least one of the plurality of rechargeable batteries from the array.

7. The system of claim 1, further comprising at least one solar panel.

8. The system of claim 7, wherein the plurality of rechargeable batteries are coupled to the at least one solar panel, and wherein the connections between the plurality of rechargeable batteries are switched from series to parallel based at least in part on a power output from the at least one solar panel.

9. The system of claim 8, wherein the controller configured to cause the change in the configuration is further configured to:
connect the plurality of rechargeable batteries in series when the power output is less than a system voltage of the plurality of rechargeable batteries; and
connect the plurality of rechargeable batteries in parallel when the power output is greater than the system voltage of the plurality of rechargeable batteries.

10. A method for dynamic control of configurations of electrical circuits, the method comprising:
providing a plurality of electric power sources comprising a first electric power source and a second electric power source;
providing a plurality of switches configured to connect and disconnect some of the electric power sources, and to modify a connection between the electric power sources between parallel connections and series connections, the plurality of switches comprising a first transistor positioned in between the first electric power source and the second electric power source arranged in series, and wherein a load is coupled to an anode of the first electric power source and a cathode of the second electric power source; and
providing a controller coupled to the plurality of switches, the controller being configured to enable and disable the switches to cause a change in a configuration of connections between the plurality of electric power sources, wherein the plurality of electric power sources are recharged at the lowest voltage capacity associated with the plurality of electric power sources.

11. The method of claim 10, wherein the plurality of switches is a plurality of transistors.

12. The method of claim 11, wherein the plurality of switches includes a metal-oxide-semiconductor field-effect transistor.

13. The method of claim 10, wherein the plurality of switches include at least one electromechanical switch.

14. The method of claim 10, wherein the change in the configuration includes one of the following:
a change of a connection of at least two of the electric power sources from in series to in parallel; and
a change of a connection of the at least two of the electric power sources from in parallel to in series.

15. The method of claim 10, further comprising:
connecting, by the controller, the electric power sources into an array;
determining, by the controller, that voltage of at least one of the electric power sources is less than a predetermined value; and
based on the determination, enabling, by the controller, the switches to disconnect the at least one of the electric power sources from the array.

16. The method of claim 15, wherein the electric power sources include at least one solar panel.

17. The method of claim 10, wherein the electric power sources include at least one generator and at least two batteries.

18. The method of claim 17, further comprising:
connecting, by the controller, the at least two batteries in series to a load for discharging; and
connecting, by the controller, the at least two batteries in parallel to the at least one generator for recharging.

19. A system for dynamic control of a configuration of electrical circuits, the system comprising:
a first rechargeable battery having a cathode and an anode;
a second rechargeable battery having a cathode and an anode, wherein the second rechargeable battery is arranged in series with the first rechargeable battery;
a transistor configured to connect and disconnect the first rechargeable battery from the second rechargeable battery, and configured to connect the first rechargeable battery to the second rechargeable battery in a parallel connection and a series connection, wherein the transistor is located in between the first rechargeable battery and the second rechargeable battery;
a load connected to the anode of the first rechargeable battery and the cathode of the second rechargeable battery;
a generator connected to both the cathode and anode of the first rechargeable battery and to both the cathode and anode of the second rechargeable battery;
a charging source; and
a controller communicatively coupled to the transistor and configured to:
determine an output of the charging source;
determine a combined voltage level of the first rechargeable battery and the second rechargeable battery; and
cause the first rechargeable battery to be connected to the second rechargeable battery in a series connection if the output is less than the combined voltage level, or in a parallel connection if the output is greater than the combined voltage level;
wherein the first and second rechargeable batteries are recharged at the lowest voltage capacity associated with the first and second rechargeable batteries.

\* \* \* \* \*